US008117529B2

(12) United States Patent
Melamed et al.

(10) Patent No.: US 8,117,529 B2
(45) Date of Patent: Feb. 14, 2012

(54) OBJECT BASED NAVIGATION

(75) Inventors: Gadi Melamed, Givat-Shmuel (IL); Ori Assaraf, Kfar Saba (IL); Ilan Perez, Raanana (IL); Ronen Eyal, Kadima (IL); Barak Hershkovitz, Kfar-Saba (IL); Yossi Tamari, Natania (IL); Stefan Kusterer, Nussloch (DE); Bernhard Drittler, Walldorf (DE); Roman Hayer, Saarbrucken (DE)

(73) Assignee: SAP AG, Walldorf (DE)

( * ) Notice: Subject to any disclaimer, the term of this patent is extended or adjusted under 35 U.S.C. 154(b) by 2052 days.

(21) Appl. No.: 10/879,484

(22) Filed: Jun. 28, 2004

(65) Prior Publication Data
US 2005/0288945 A1    Dec. 29, 2005

(51) Int. Cl.
*G06F 17/00* (2006.01)
(52) U.S. Cl. ......... 715/201; 715/757; 707/100; 707/101
(58) Field of Classification Search ............... 715/201
See application file for complete search history.

(56) References Cited

U.S. PATENT DOCUMENTS

| 6,407,761 B1 * | 6/2002 | Ching et al. ............ 715/835 |
| 6,918,090 B2 * | 7/2005 | Hesmer et al. ............ 715/760 |
| 7,545,362 B2 * | 6/2009 | Kong ............ 345/158 |
| 2001/0009016 A1 * | 7/2001 | Hofmann et al. ............ 709/219 |
| 2002/0005867 A1 * | 1/2002 | Gvily ............ 345/760 |
| 2002/0103824 A1 | 8/2002 | Koppolu et al. |
| 2002/0169852 A1 | 11/2002 | Schaeck |
| 2003/0163513 A1 * | 8/2003 | Schaeck et al. ............ 709/201 |
| 2004/0019611 A1 | 1/2004 | Pearse et al. |
| 2005/0005019 A1 * | 1/2005 | Harville et al. ............ 709/231 |
| 2005/0246632 A1 * | 11/2005 | Guido et al. ............ 715/517 |
| 2005/0267789 A1 * | 12/2005 | Satyadas et al. ............ 705/7 |
| 2006/0010390 A1 * | 1/2006 | Guido et al. ............ 715/742 |
| 2006/0053376 A1 * | 3/2006 | Ng et al. ............ 715/742 |
| 2008/0052617 A1 * | 2/2008 | Guido et al. ............ 715/246 |
| 2009/0006578 A1 * | 1/2009 | Schaeck ............ 709/217 |

FOREIGN PATENT DOCUMENTS

| WO | WO 01/80065 A2 | 10/2001 |
| WO | WO 01/90908 A1 | 11/2001 |
| WO | 03/001413 A1 | 1/2003 |
| WO | 2004/010354 A2 | 1/2004 |

* cited by examiner

*Primary Examiner* — Quoc A Tran
(74) *Attorney, Agent, or Firm* — Buckley, Maschoff & Talwalkar LLC

(57) ABSTRACT

The object based navigation is an intelligent user interface that uses a source object to determine which target information is to be presented to the user. This is done by associating an object to one or more operations, so that selection of a given source object would result in a predefined operation to be activated. The role of the user may also affect the predefined operation that is activated. If multiple operations are associated with a given source object, these operations may be prioritized, so that the one with the highest priority is performed as a default operation.

20 Claims, 11 Drawing Sheets

Source

OBJECT BASED NAVIGATION

BACKGROUND OF THE INVENTION

The present invention relates to the field of human-computer interaction, and in particular to user interfaces for navigating through complex databases.

Computer networks have become ubiquitous in business, industry, and education. Development and wide acceptance of the Internet have enabled network resources, accounts and applications to become available from almost anywhere in the world and at virtually anytime. The Internet is most commonly used in the World Wide Web ("The Web") environment. The Web uses the hypertext protocols to present information, which greatly simplifies the information retrieval by users.

These developments have enabled networks to serve as a platform for global electronic commerce, as seen by the rise of Yahoo!, EBay and Amzaon.com. The Web also enables easy exchange of information between businesses and their customers, suppliers and partners.

Businesses of any significant size now see the Internet and effective use of computers as being crucial to their business strategies. This has led to a great demand for business or enterprise applications that are used to better organize, store, and process data. Increasingly, these enterprise applications are being provided in a portal environment due to its ease of use and effectiveness in integrating together complex databases having different formats. These databases may also be stored in many different geographic locations. One example of the enterprise portal is mySAP.com™ by SAP, AG, a German software company.

Among other issues, the construction and maintenance of user interfaces is becoming central problem for a large, complex systems, such as a portal. User interfaces are the bridge between applications and users, and, as a result, have to cope with the complexities of both.

Faster and more capable machines and networks are providing users with more functionalities and more information, but at the same time are overwhelming them with more commands and options. User interfaces need to become more intelligent to assist users in performing their tasks, i.e., make it easier for the users to navigate through various data sources and retrieve desired information.

BRIEF SUMMARY OF THE INVENTION

The present invention relates to data navigation in a computer system, particularly in a system having complex databases. A portal is one example of such a system. The embodiments of the present invention relates to an object based navigation or object link navigation. The object based navigation is an intelligent user interface that uses a source object to determine which target information is to be presented to the user. This is done by associating an object to one or more operations, so that selection of a given source object would result in a predefined operation to be activated. In one implementation, the role of the user also affects the predefined operation that is activated. If multiple operations are associated with a given source object, these operations may be prioritized, so that the one with the highest priority is performed as a default operation.

In one embodiment, object based navigation allows defining of operations for objects and as well as defining of which iViews/pages are to implement these operations. iViews are portal snippets or presentation components that performs a certain operation to retrieve information and present them to a user. Pages are webpages and may include one or more iViews.

In one embodiment, a method of navigating within a portal environment including a client and a portal includes receiving a request based on a user's selection of a given business object from a plurality of business objects presented in a source portal snippet, each business object including a kernel and business logic, the selected business object having a plurality of operations that are associated thereto, the plurality of operations including first and second operations; determining an appropriate operation to invoke from the plurality of operations; and launching a first target portal snippet associated with the first operation if the first operation has been determined to be the appropriate operation at the determining step. The first portal snippet includes a query portion to retrieve desired information and a presentation portion to display the retrieved information to the user.

In one embodiment, a computer product includes a computer program for navigating within a portal environment including a client and a portal. The program comprises code for receiving a request based on a user's selection of a given business object from a plurality of business objects presented in a source portal snippet, each business object including a kernel and business logic, the selected business object having a plurality of operations that are associated thereto, the plurality of operations including first and second operations; code for determining an appropriate operation to invoke from the plurality of operations; code for launching a first target portal snippet associated with the first operation if the first operation has been determined to be the appropriate operation at the determining step, and code for launching a second target portal snippet associated with the second operation if the second operation has been determined to be the appropriate operation at the determining step. The first portal snippet includes a query portion to retrieve desired information and a presentation portion to display the retrieved information to the user.

In another embodiment, a portal coupled to one or more clients and having access to a plurality of databases includes means for receiving a request based on a user's selection of a given business object from a plurality of business objects presented in a source portal snippet, each business object including a kernel and business logic, the selected business object having a plurality of operations that are associated thereto, the plurality of operations including first and second operations; means for determining an appropriate operation to invoke from the plurality of operations; and means for launching a first target portal snippet associated with the first operation if the first operation has been determined to be the appropriate operation at the determining step. The first portal snippet includes a query portion to retrieve desired information and a presentation portion to display the retrieved information to the user.

In yet another embodiment, a portal coupled to a plurality of clients and having access to a plurality of databases includes a portal server to communicate with the clients; a unification server to communicate with one or more external applications; a portal content repository to store a plurality of portal snippets; and a computer readable medium including a computer program for program for navigating within a portal environment. The computer program includes code for receiving a request based on a user's selection of a given business object from a plurality of business objects presented in a source portal snippet, each business object including a kernel and business logic, the selected business object having a plurality of operations that are associated thereto, the plurality of operations including first and second operations; code for determining an appropriate operation to invoke from the plurality of operations; and code for launching a first target portal snippet associated with the first operation if the first operation has been determined to be the appropriate operation at the determining step. The first portal snippet includes a query portion to retrieve desired information and a presentation portion to display the retrieved information to the user.

DETAILED DESCRIPTION OF THE INVENTION

The present invention relates to data navigation within a computer system having complex databases. Embodiments of the present invention are directed to providing object based navigation or object link navigation. That is, a user is allowed to navigate through various information sources and retrieve desired information by selecting desired business objects in a source iView. An operation that is associated with the selected object is activated or launched. The operation performed and information presented may also be based on the role of a given user. The present invention is illustrated below primarily in a portal environment; however, the invention may also be used in other computer environments, e.g., a client-server system that is not provided in a portal setting.

Figure 1:
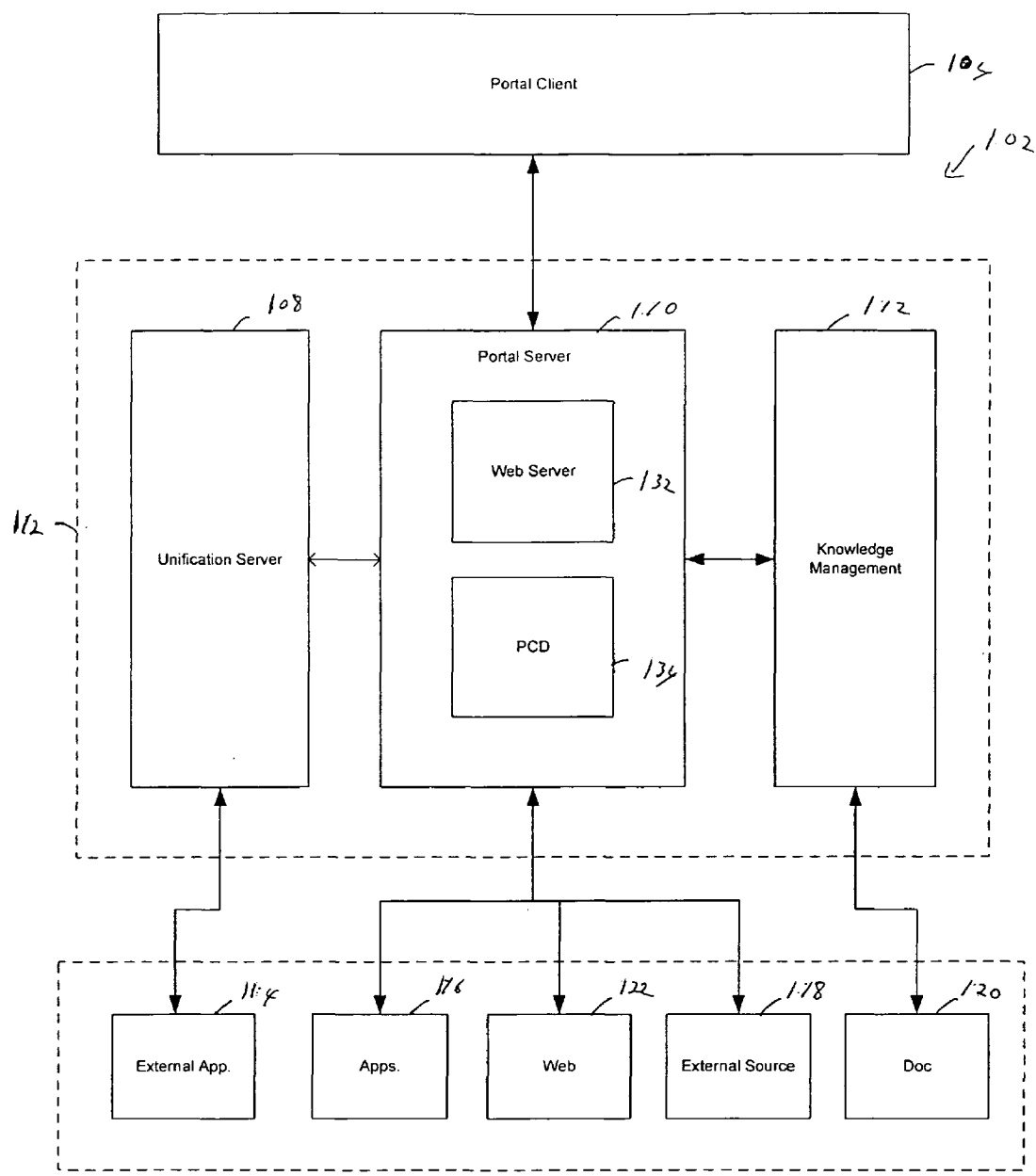
FIG. 1 illustrates an enterprise portal wherein the object based navigation (OBN) is provided according to one embodiment of the present invention.

FIG. 1 illustrates an enterprise portal 102 wherein the object based navigation (OBN) is provided according to one embodiment of the present invention. The portal is configured to provide users with a common entryway to various applications and information, e.g., by providing access to portal components including one or more portal pages, portal snippets, etc. A portal page may comprise one or more portal snippets that enable data to be retrieved and displayed on the portal page. Portal snippets are generally programs that retrieve data from an information resource and display it on a portal page. Examples of portal snippets include portlets, SAP's iViews, Plumtree's gadgets, Microsoft's web parts, etc. Portals generally allow a user to select and customize portal snippets that are included in the user's portal page or pages. In this manner, the user can customize the content that is retrieved and displayed on the user's portal page. Portal snippets may be developed using Integrated Development Environments (IDEs) such as Visual Studio .NET from Microsoft Corporation. In general, an integrated development environment (IDE) is a set of integrated tools for developing software.

Two characteristics are generally associated with a portal snippet: the content retrieved by the snippet and the manner in which the content is displayed on a portal page. With respect to the content that is retrieved, a portal snippet can be considered as an information query (or multiple queries) having one or more input parameters that is executed to retrieve information from one or more information sources. The parameters to the query and their values may be set by the portal administrator, the portal snippet designer/programmer, or some other user, or may be set by default. With respect to the presentation aspect, each portal snippet is typically allocated a location on a page or screen where the retrieved information is to be displayed.

When a user connects to and logs into a portal and views a portal page comprising a portal snippet, the portal snippet is automatically invoked. As a result of the invocation, the one or more parameterized queries corresponding to the portal snippet are executed to obtain the relevant information from one or more information resources. Examples of queries include a query accessing stock information, a query accessing weather information, a query to access company news, query to access a particular set of documents, etc. The retrieved information is then displayed on the section of the page allocated to the portal snippet.

Accordingly, in the present embodiment, the portal snippet includes a query portion that retrieves information and a presentation portion that displays the retrieved information. However, the portal snippet may be used to refer to just the query portion or the presentation portion. The term "portal snippet" is used broadly to include the above variations unless specifically limited by the context where it is used. The term "presentation component" is used interchangeably with "portal snippet."

Referring back to FIG. 1, the portal 102 couples a client 104 to a plurality of information sources 106. The portal includes an application layer that connects the client to the information sources. The application layer serves as an interface to a database layer that is associated with the information sources. The portal also includes a presentation layer that is involved in presenting the information retrieved to the user. The presentation layer is generally associated with the client and a web server in the portal. Generally, the computer systems that functions on the application and database layers are referred to as "backend systems," whereas the computer system that functions on the presentation layer are referred to as "frontend systems."

The client 104 may be a personal computer (PC) that is linked to the portal 102 via the Internet, intranet, wide area network, local area network, or the like.

In the present embodiment, the portal 102 integrates a plurality of different technologies, enabling users to access applications and information that are both internal and external to the enterprise. The information sources 106 include an external application 114 (with respect to a given enterprise), internal application 116 (with respect to the given enterprise), external document source 118, internal document source 120, and Web 122.

The portal includes a unification server 108, a portal server 110, and a knowledge management 112. The unification server is configured to provide a business unification layer that enables dynamic integration of both applications and information from various sources. The business unification layer enables the creation of a unified object model, so that a portal user may dynamically integrate applications and information.

Business objects, provided in component systems, are used to create a unification object model that is stored in a repository. The objects are mapped to each other by links, so that users are able to dynamically pass content from one information source to another.

The business object is a module or set of instructions that is modeled to perform a specific task or behave in a certain way. The business objects are used to represent a thing, concept, process or event in operation, management, planning or accounting of an organization. Each business object specify attributes, relationships, and actions/events. For example, the business objects may be used to represent purchase orders, vendors, and users of a system.

In the present embodiment, the business object is a portal platform entity that encapsulates data and one or more business processes, thereby hiding the details of the structure and implementation of the underlying data. To achieve this encapsulation, the business objects have multiple layers. At the core is the kernel that represents the object's inherent data. An integrity layer (the second layer) is provided over the core and represents the business logic of the object and comprises the business rules and constraints that apply to the business object. An interface layer is provided as the third layer. This layer describes the implementation and structure of the business object and defines the object's interface to the outside world. An access layer is provided as the fourth and outermost layer. This layer defines the technologies that can be used to obtain external access to the object's data, e.g., Component Object Model (COM) and Distributed Component Object Model (DCOM).

Referring back to FIG. 1, the portal server 110 includes a web server 132 that communicates with the client and a portal content directory (PCD) 134 that includes a plurality of presentation components, e.g., iViews. In one embodiment, the PCD is a file-based directory and runs on a Java 2 Enterprise Edition™—compliant application server.

The knowledge management (KM) 110 is a set of services for managing knowledge and collaboration. The KM 110 provides a platform to harmonize various business tools under one business management platform regardless of the physical location of data. In one implementation, the KM includes a repository framework that manages the content of documents and corresponding document attributes, classification engine that organizes contents in folder or tree structures, and other components for managing information.

Figure 2:
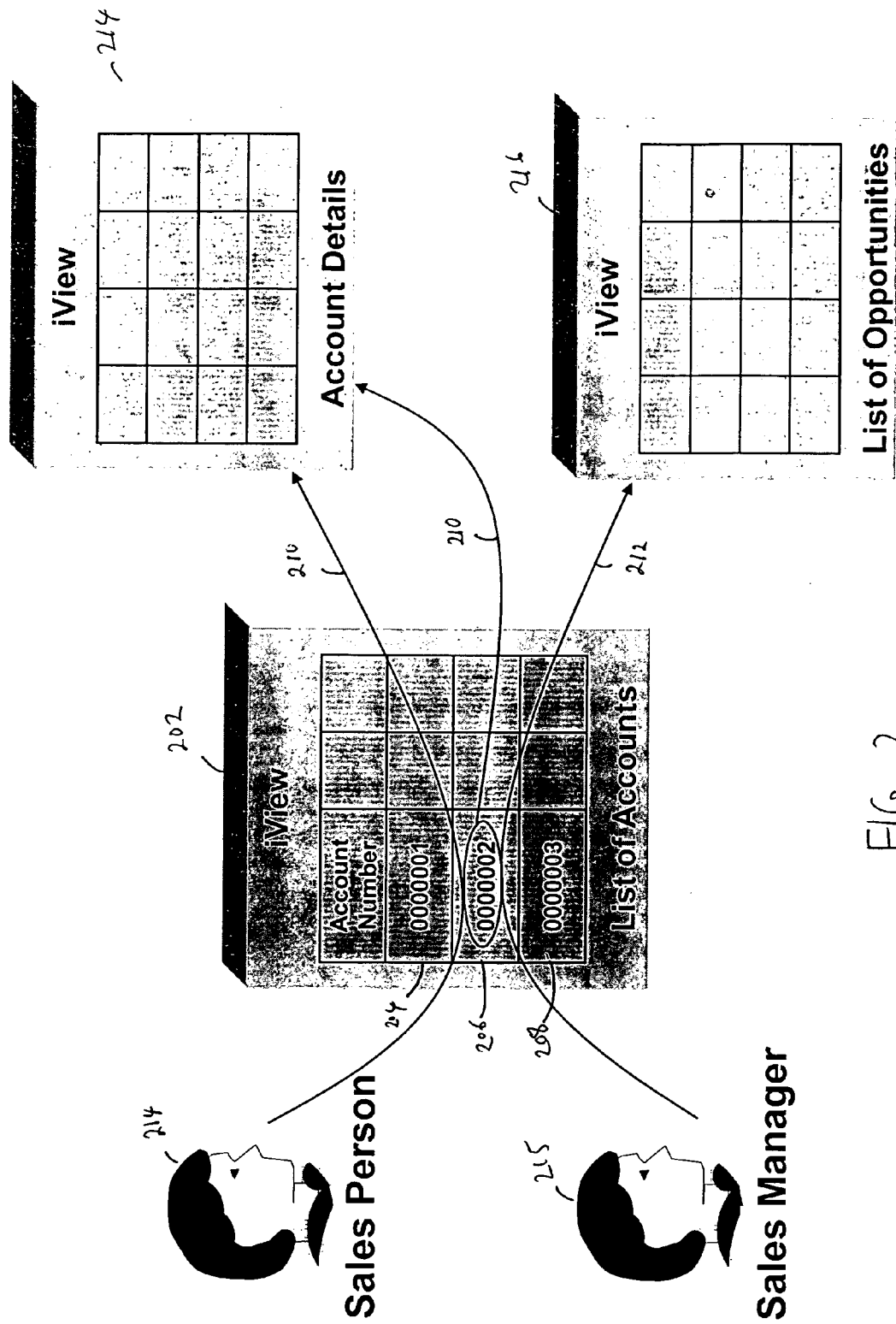
FIG. 2 illustrates an object based navigation ("OBN") according to one embodiment of the present invention.

FIG. 2 illustrates an object based navigation ("OBN") according to one embodiment of the present invention. In one implementation, this navigation method is offered as an additional navigation method by the back-end systems of the portal. The back-end systems are those computer systems that are not directly involved with the presentation layer of the portal. In OBN, the business objects have operations that can be performed. The portal snippets, e.g., iViews, can declare that they implement these operations.

As used herein, the iView is a type of portal snippet or portal presentation components that performs a specific task, e.g., retrieving specific data from the applications and/or databases and displaying them to the client in a specified way. Hence the term iView is derived from the words "integrated view." As used herein, the iView may be used to refer to both the components that perform the required task or operation as well as the information displayed to the user. The iViews are presented on a page. The page, accordingly, could be considered as a container that may include one or more iViews. For illustrative purposes, the terms "page" and "iView" are used interchangeably.

Referring back to FIG. 2, an iView 202 includes a plurality of business objects 204, 206, and 208. The iView 202 provides a list of accounts. Each account in the list is represented by a business object. Each object is associated with at least one operation. The object 205 is associated with a first operation 210 that provides the account in more detail when executed and a second operation 212 that provides a list of opportunities when executed. Depending on the role of the user, either the first or second operation is executed when the business object 206 is selected.

For example, when a sales person 214 selects the business object 206, the first operation 210 is executed so that an iView 214 is launched to provide the account details. The iView 214 provides information obtained as a result of executing or implementing the first operation. However, the sales person is not allowed to view an iView 216 implemented by the second operation. When a sales manager 215 selects the same business object, the second operation 212 is executed to launch the iView 216 on the list of opportunities.

Alternatively, the manger may be allowed view the iViews implemented by both the first operation 210 and second operation 212. In such as case, the first and second operations may be prioritized, so that the operation with a higher priority is set as the default operation to be executed when the manager selects the business object 206. In another implementation, a context menu may be presented to the user when a business object that is associated with a plurality of operations is selected. The user then can selected the desired operation or iView from the menu. In a sense, selecting an operation from the menu is equivalent to selecting an iView since the iView that is displayed corresponds to the operation that has been selected.

In yet another implementation, selecting an object one way (e.g., using a left button of a mouse) executes the default operation while selecting the object another way (e.g., using a right button of a mouse) causes the menu to be displayed.

In the above example, the object based navigation incorporates a role-based operation. However, the navigation may be based purely on the selected objects, so that the operation performed would not vary according to the role of the user.

The operation is a business object operation that is used to define connection between a business object and a presentation component (e.g., iView). In present embodiment, the operation is a portal platform entity, and the connection is defined by an administrator.

Figure 3:
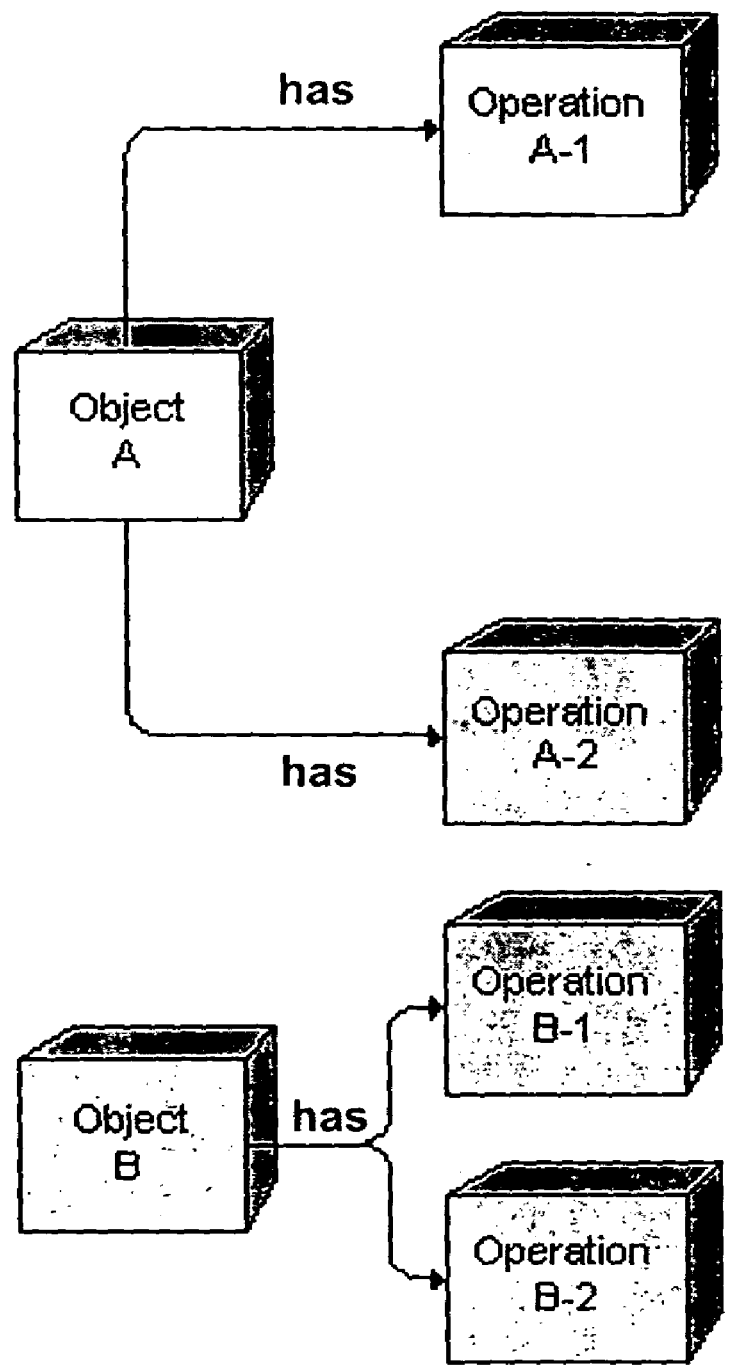
FIGS. 3, 4, and 5 illustrate a method of implementing the object based navigation ("OBN") according to one embodiment of the present invention.
Figure 4:
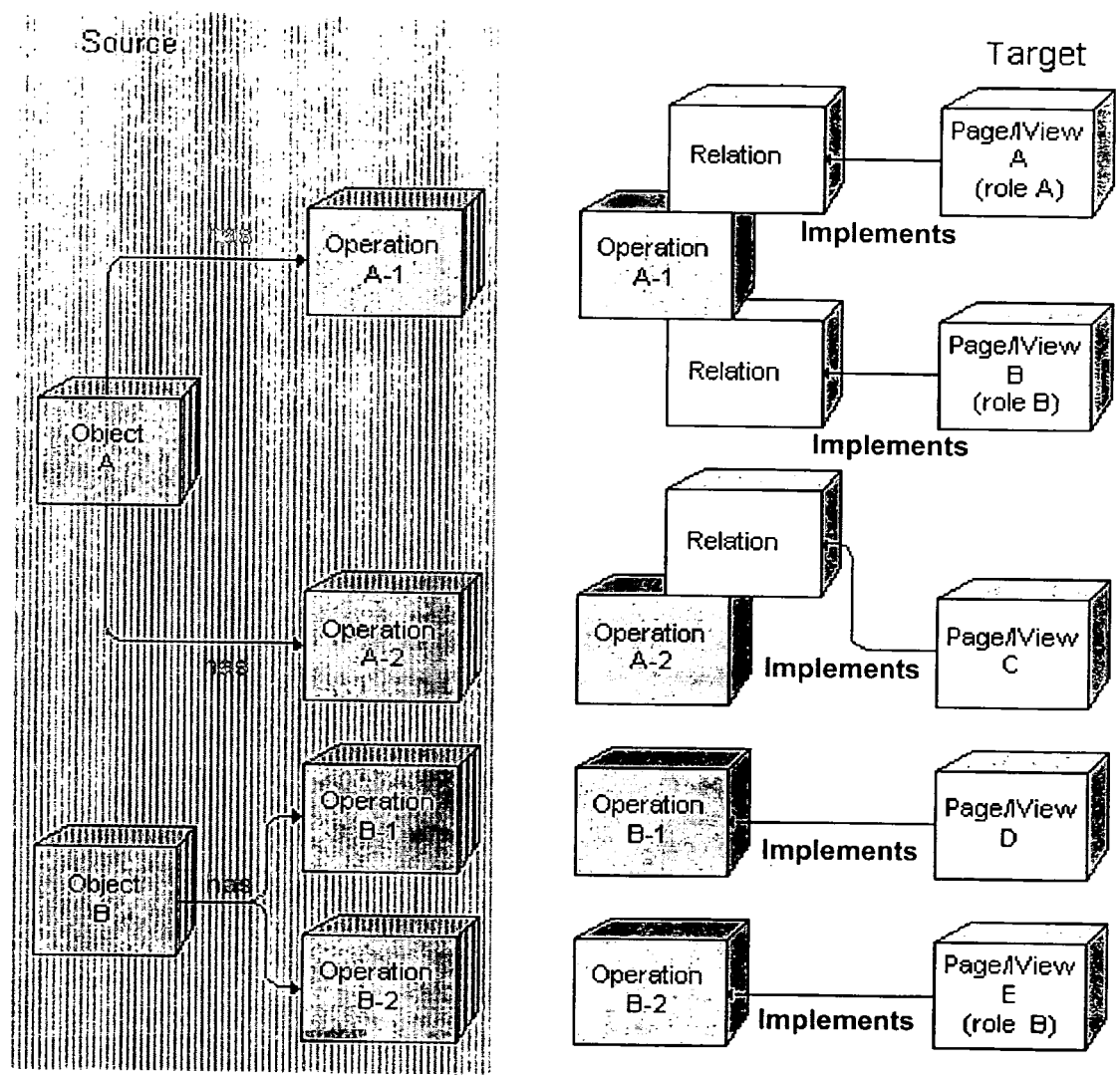
Figure 5:
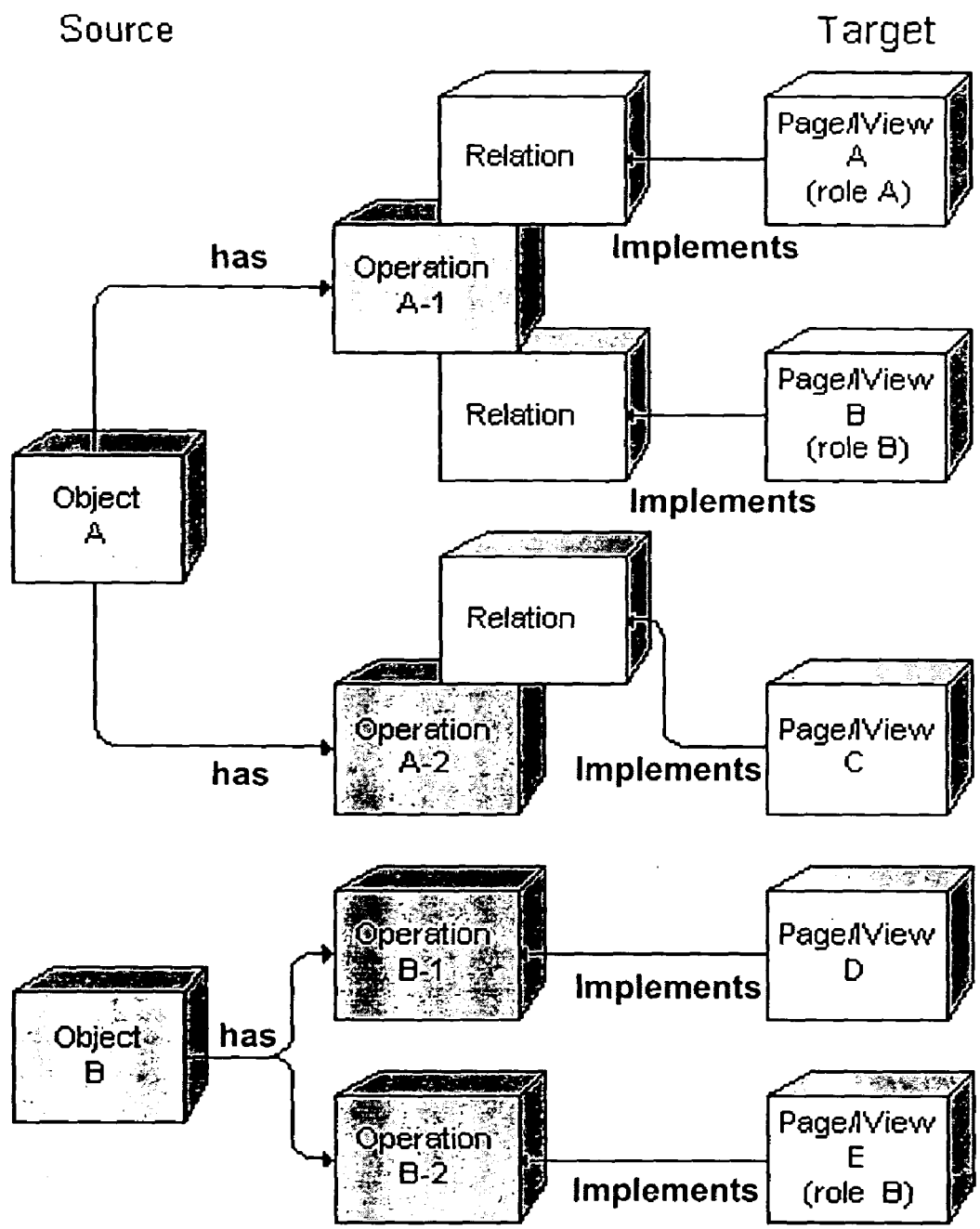

FIGS. 3, 4, and 5 illustrate a method of implementing the object based navigation ("OBN") according to one embodiment of the present invention. One or more operations are created (FIG. 3). The operation is implemented by associating an iView to the operation (FIG. 4). An object based navigation (OBN) call is added to a source iView, e.g., to a business object in the source iView (FIG. 5).

As shown in FIG. 3, operations A-1 and A-2 are created and associated with a business object A. Operations A-1 and A-2 may each be a given different priority. For example, operation A-1 may be assigned Priority 4, and operation A-2 may be assigned Priority 2, so that operation A-1 would be set as the default operation when object A is selected by a user. Similarly, operations B-1 and B-2 are created and associated with a business object B. These operations may be provided with priority as well. Once an operation is created/associated with a business object, the business object may be referred to as an OBN source object or source object. The source iView includes OBN calls to activate the OBN functionalities.

Figure 6:
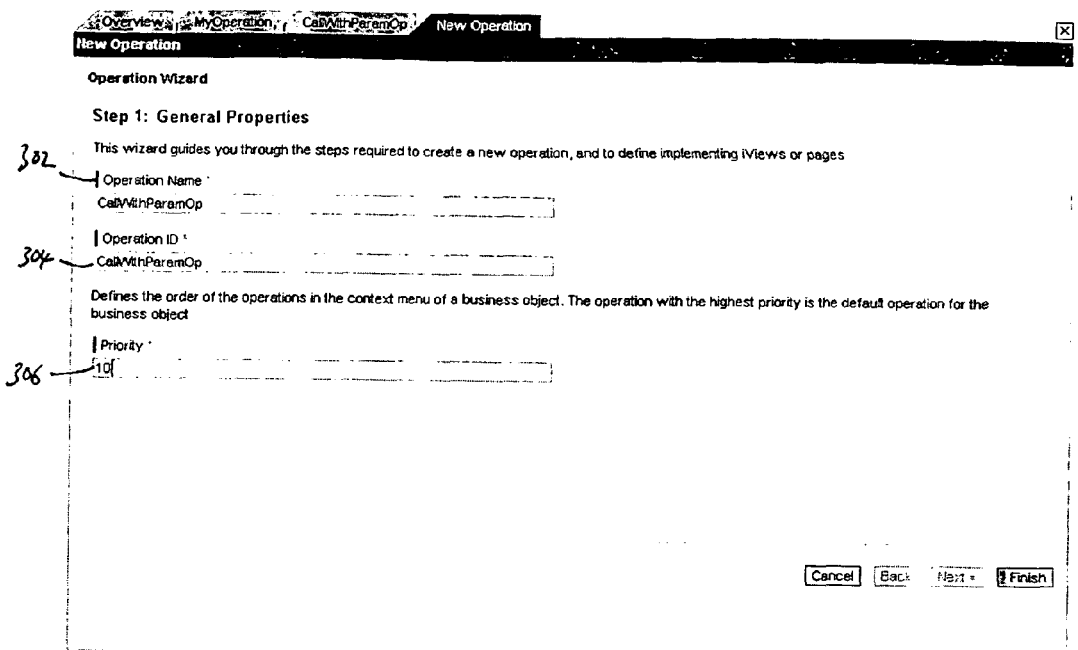
FIG. 6 illustrates an operation wizard for creating operations according to one embodiment of the present invention.

In one embodiment, the operations are created by using an operation wizard (FIG. 6). The operation wizard may be launched from the context menu of a business object to create a new operation and attach it to the business object from which the wizard was launched. The operation wizard contains three fields, i.e., a name field 302, an ID field 304, and a priority field 306, that simply require the administrator to enter values for the name and ID of the business object operation, and assign a priority to the operation. Once the operation has been created successfully, an operation editor (FIG. 7) is opened. The operation editor enables association iViews to the operation for implementation at runtime, as explained below in more detail.

FIG. 4 illustrates a method of implementing the operations that has been created according to one embodiment of the present invention. The operations are implemented by relating or associating the operations to iViews. Generally, these iViews are the iViews existing in the portal, so that the implementation may be done by assigning one or more iViews to an operation, e.g., forming a link. For example, operation A-1 is related to iView A and iView B. Similarly, iView C is related to operation A-2, and iView D is related to operation B-1, and iView E is related to operation B-2. These iViews are referred to as target iViews since they are presented to the user as a result of having the user select object A and implementing operation A-1.

In one implementation, in a role-based OBN, iView A is associated with role A (e.g., sales person), and iView B is associated with role B (sales manager), so that operation A-1 would launch different iViews according to the role of the user. If the role of the user is a sales person, then operation A-1 is implemented by launching iView A. On the other hand, if the role of the user is a sales manager, then operation A-1 is implemented by launching iView B.

Figure 7:
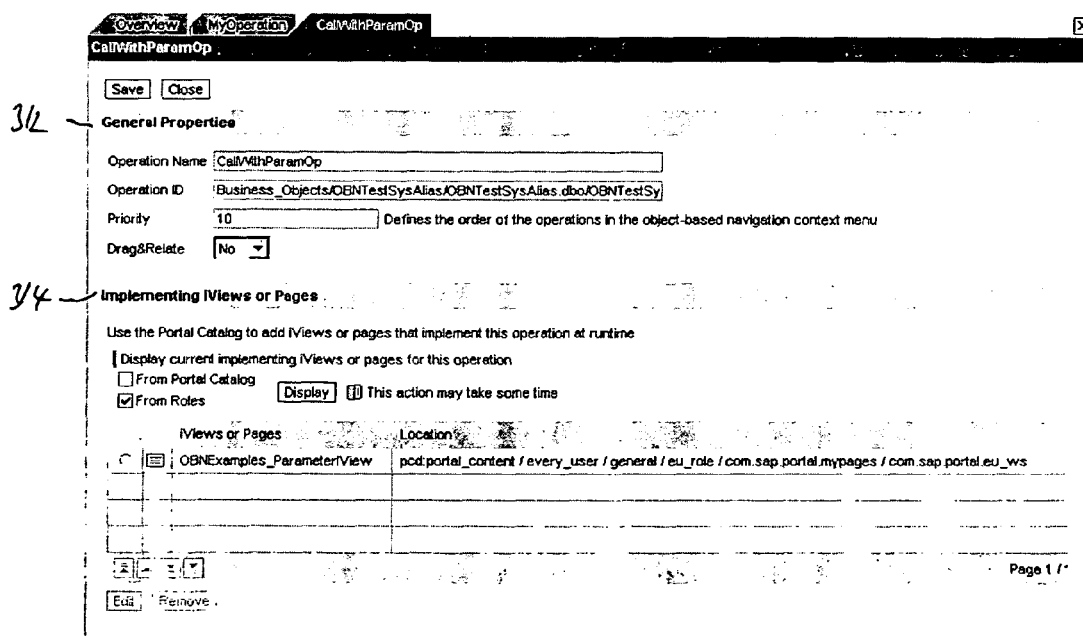
FIG. 7 illustrates an operation editor for implementing operations according to one embodiment of the present invention.

FIG. 7 illustrates an operation editor used to associate iViews to operations according to one embodiment of the present invention. As explained above, the operation editor is opened automatically upon creation of a new operation in the present embodiment. The operation editor has two separate sections: (1) a general properties section 312, and (2) an implementing iViews section 314. In the first section 312, the general properties of the operation, e.g., the name, ID, and priority, are displayed for review and modification. The second section 314 displays all the iView implementing the current operation. These iViews are listed in a table and may be edited or removed.

FIG. 5 illustrates a logical view of business objects, operations, and iViews once the OBN calls are planted in iViews according to one embodiment of the present invention. In the figure, operation A-1 that is created and associated with object A is related to iViews A and B. The iView A is associated with role A, and iView B is associated with role B. Operation A-2 that is created and associated with object A is related to iView C. Accordingly, object A has two different operations that may be executed to launch three different iViews depending on the role of a user. Similarly, operations B-1 and B-2 that are created and associated with object B are implemented with iViews D and E, respectively.

The OBN calls are planted in the source iView that includes a source object to activate the object based navigation at runtime in one implementation. That is, OBN calls are embedded in source code of the iViews in order to activate the OBN functionality. These calls can be placed either in JavaScript or in the Java part of the iView code. In another implementation, the calls may be directly planted in the source object.

Figure 8:
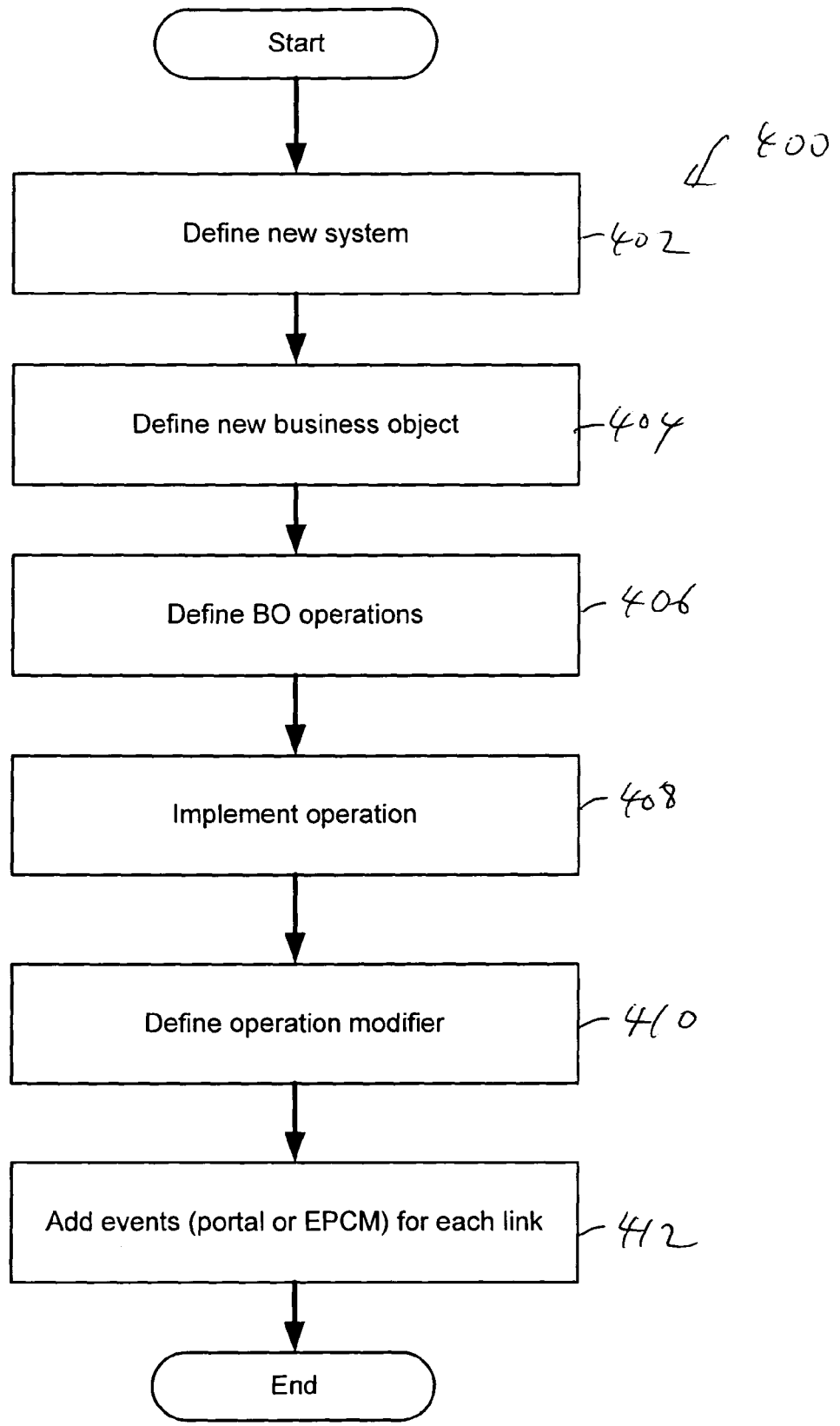
FIG. 8 illustrates a design-time process of the object based navigation according to one embodiment of the present invention.

FIG. 8 illustrates a design-time process 400 of the object based navigation according to one embodiment of the present invention. At step 402, an administrator defines a new system in the system landscape. A system alias is defined for each new system. Step 402 may be skipped if the system has been previously defined.

A new business object is defined (step 404). The new business object may be defined in two different ways: (1) using a manual editor, as text, or (2) by retrieving a business object from the back-end system via a connector. The connector is a middleware component that provides a dynamic integration between application processes and server systems. The new business object is defined or identified by providing the identifier of the business object, system alias, and display name of the business object. The identifier is a unique name used to identify a given component. The display name is a user-friendly name that is used to represent a given component and does not have to be unique to that component.

One or more operations are defined for a specific business object (step 406). The operation is defined by providing the identifier, display name, and priority of the operation. An operation that has been defined is implemented by defining a target iView to be related to the operation (step 408). Optionally, an operation modifier may be defined (step 410). The modifier may be used to change the display names and priorities of operations and to manually define relation between a source object and a target iView. Thereafter, an iView coder adds at least one portal event for each link that has been defined (step 412). The portal event or OBN call activates the OBN functionality when the source object is selected. In one embodiment, two events are added for each link. The first event allows default navigation by clicking on the required object. The second event allows opening of a pop-up menu when the source object is selected. The menu allows a user to select an operation to activate if there are two or more operations that are associated with that source object.

Figure 9:
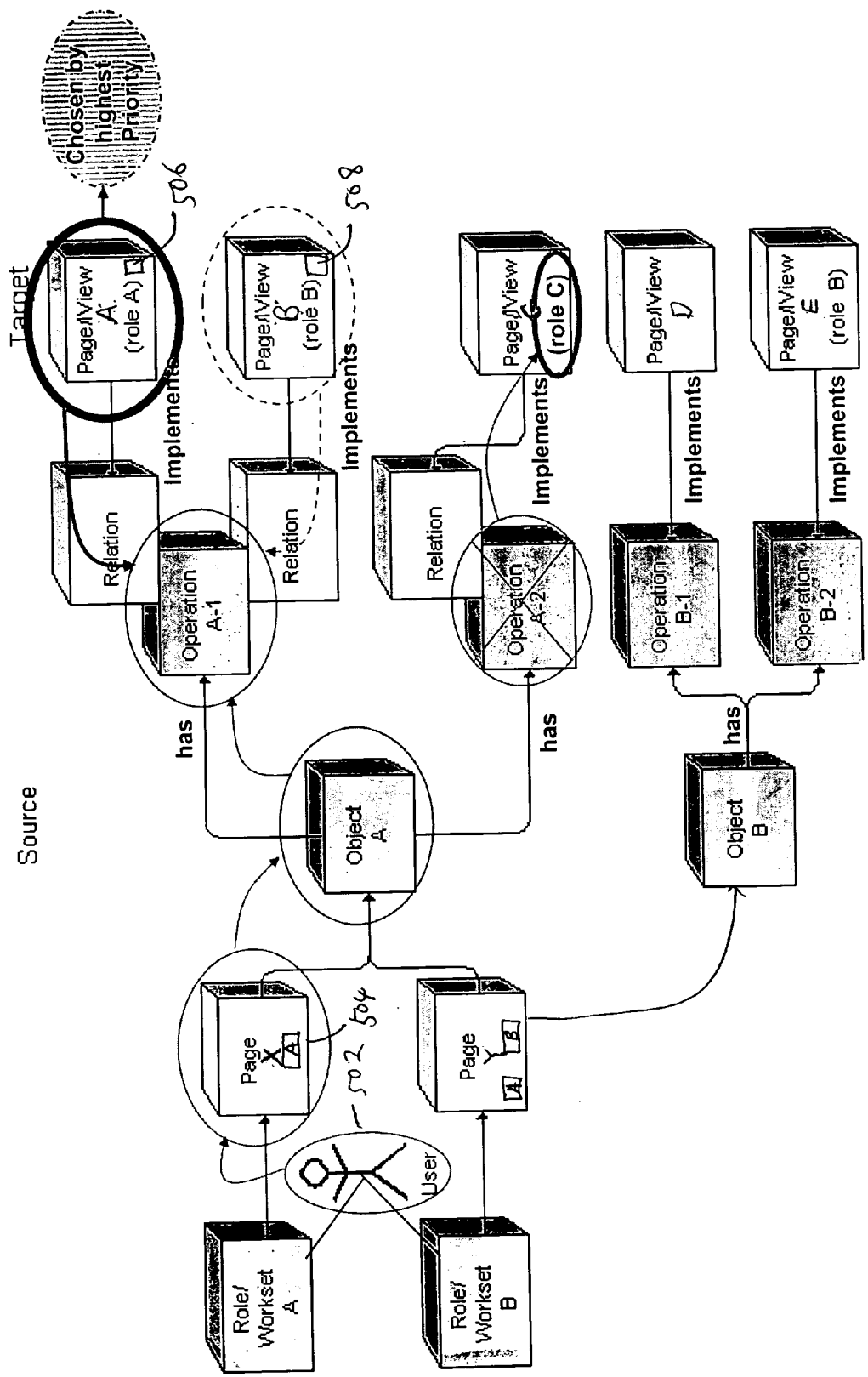
FIG. 9 illustrates a logical view of the object based navigation during runtime according to one embodiment of the present invention.

FIG. 9 illustrates a logical view of the object based navigation during runtime according to one embodiment of the present invention. A user 502 is assigned roles A and B (e.g., the user has a dual roles of sales manager and marketing manager). The user logs on to the portal 102 via the client 104. The user is provided with a page X, which includes a business object A. The page may be an iView itself or a container for Views.

Page X has a business object A, which is denoted with numeral 504. Object A is associated with a first operation A-1 and a second operation A-2. If the user selects object A, e.g., by clicking a mouse button, first operation A-1 is activated. First operation A-1 is activated but not second operation A-2 since the latter is related to role C, which is not one of the roles assigned to the user.

Two iViews (A and B) are related to first operation A-1. iView A is assigned to role A, and iView B is assigned to role B. In the present implementation, since both iViews could be launched by the first operation, the one with the higher priority is launched as the default iView, e.g., the iView A. If the user, however, wishes to obtain the iView B, then the user may select object A in such a way that a context menu (or pop-up menu) is displayed to the user. The menu provides all of iViews that could be launched by first operation A-1 (in this example, iViews A and B). The user selects the desired iView on the menu to launch that iView. In the present embodiment, the default iView is launch automatically if the object A is selected using a left mouse button, and the menu is displayed if the object A is selected using a right mouse button.

In one embodiment, once iView A is launched as the default iView by the first operation, the user may view iView B by clicking a designated icon 506 on the first iView. This would automatically launch an iView with the next highest priority. iView B also has a designated icon 508, which would launch the iView with the next highest priority or toggle back to the default iView.

Figure 10:
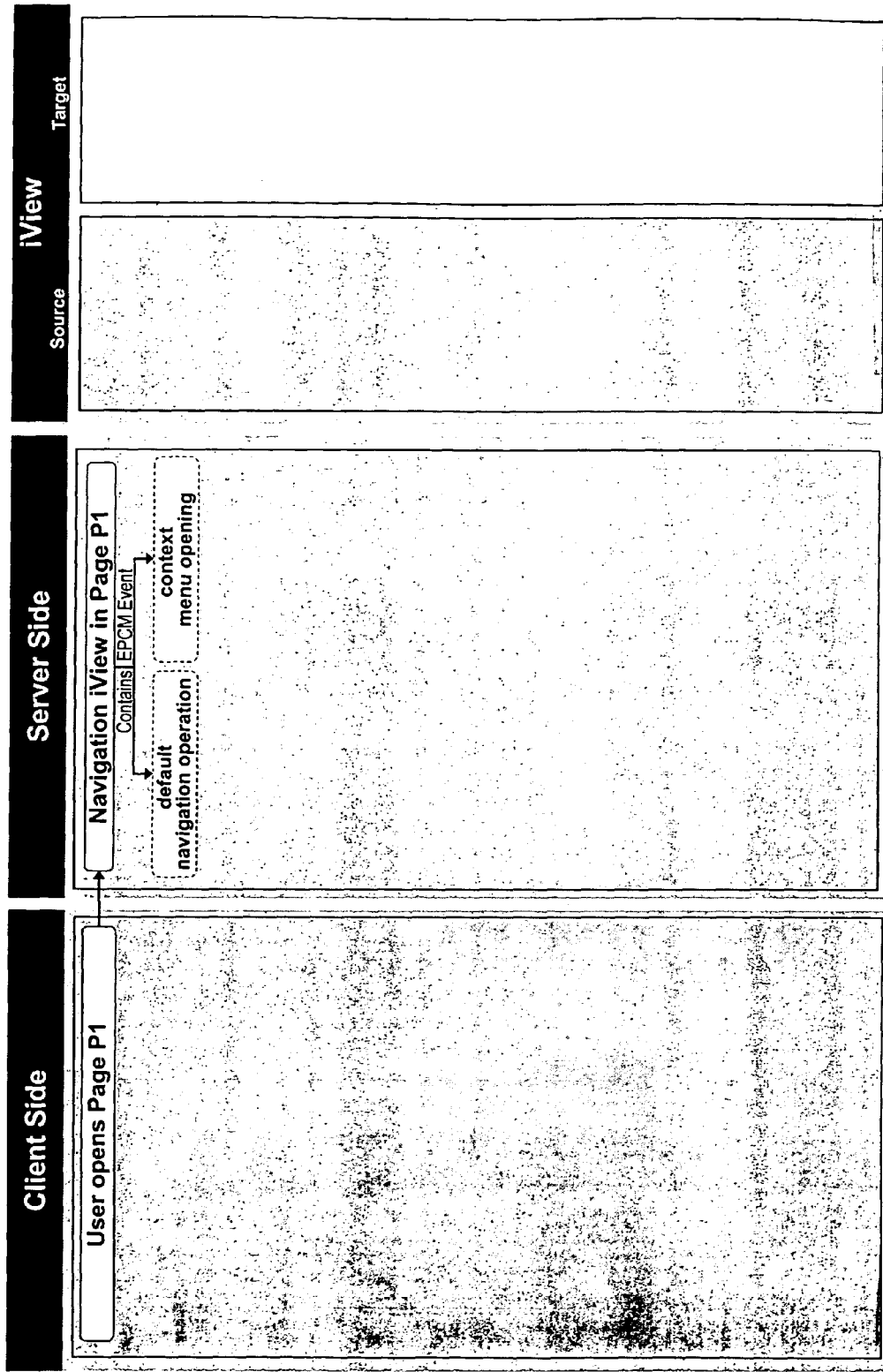
FIGS. 10-12 illustrate a run-time flow of the object based navigation according to one embodiment of the present invention.
Figure 11:
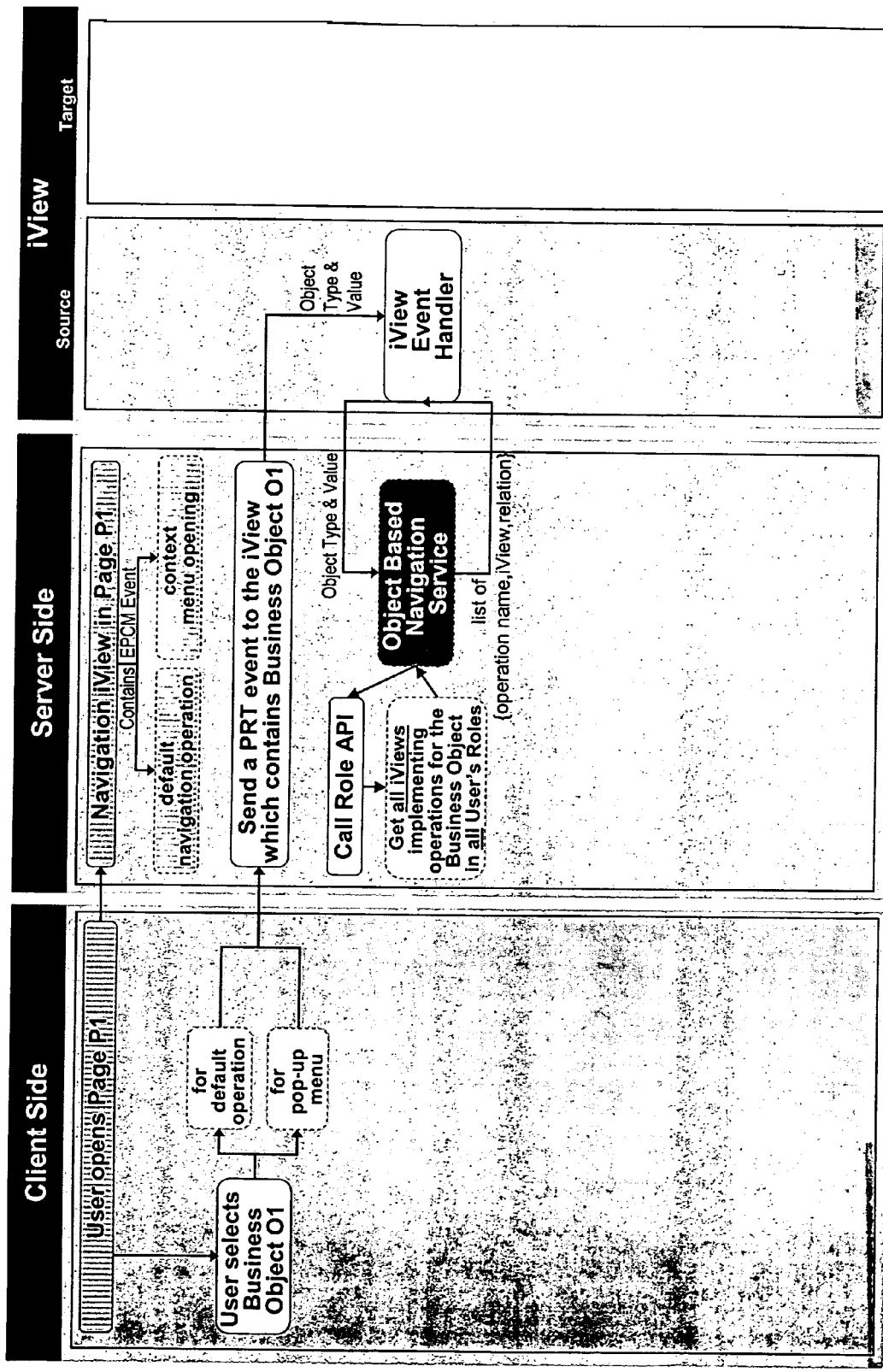
Figure 12:
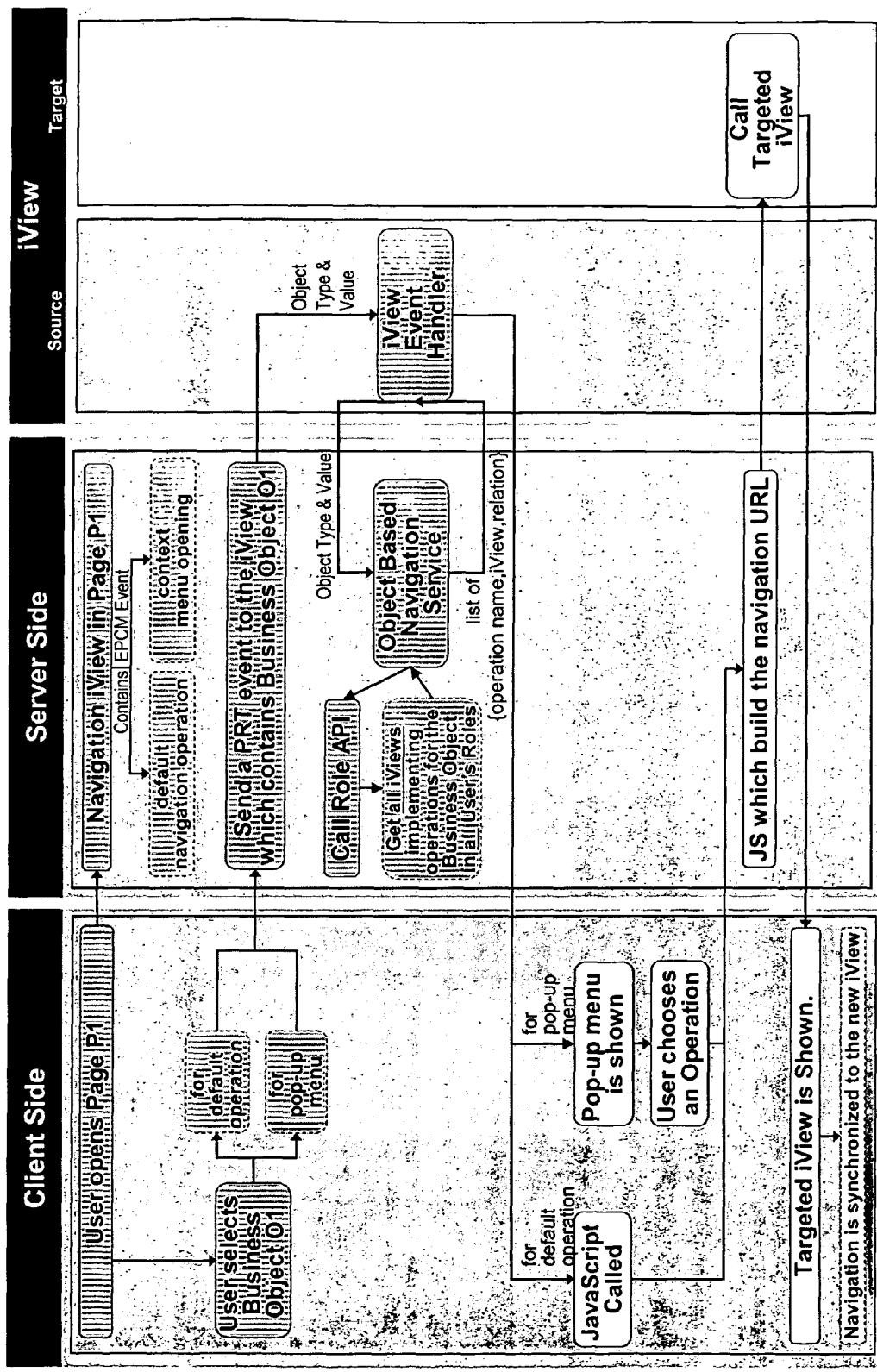

FIGS. 10-12 illustrate a run-time flow of the object based navigation according to one embodiment of the present invention. As shown in FIG. 10, a user first opens a page P1 at the client side and navigate to a source iView in page P1. The source iView includes portal events or OBN calls. The calls may be for a default navigation operation to launch the default iView or operation (i.e., the one with the highest priority) or for opening a context menu to list the available target iViews.

Next, the user selects one of objects in the source iView (FIG. 11). If the user selects the source object in one way (e.g., left click on the mouse), then a default operation is activated to launch the default iView. If the user selects the source object in another way (e.g., right click on the mouse), then a menu is displayed to list the available target iViews. Either way, the user's request is transmitted to the server side (or to portal). The server sends a portal event to the iView which includes the selected business object. The iViews may be stored in the PCD 134 or other repositories. An iView event handler processes the portal event and launches the object based navigation service. This service calls a role API to get all iViews implementing the operations for the selected business object.

Referring to FIG. 12, at the client side, a JavaScript is called if the user had requested for the default iView. If the user asked for a context menu, the user is required to choose a desired target iViews from those listed in the menu.

At the server side, the JavaScript that has been called builds the navigation Universal Resource Locator ("URL") and calls the target iView from all iViews gathered by the role API. The target iView may be the default iView or one that has been selected from the menu. The target iView is then displayed on the client side.

The present invention has been illustrated using specific embodiments. Accordingly, the embodiments disclosed above should not be used to limit the scope of the present invention. The scope of the present invention should be interpreted using the appended claims.

What is claimed is:

1. A method of navigating within a portal environment including a client and a portal, the method including:
   receiving a request based on a user's selection of a given business object from a plurality of business objects presented in a source portal snippet, each business object including a kernel and business logic, the selected business object having a plurality of operations that are associated thereto, the plurality of operations including first and second operations;
   determining an appropriate operation to invoke from the plurality of operations; and
   launching a first target portal snippet associated with the first operation if the first operation has been determined to be the appropriate operation at the determining step,
   wherein the first portal snippet includes a query portion to retrieve desired information and a presentation portion to display the retrieved information to the user; and
   wherein the first portal snippet is displayable in a table of an operation editor that associates a plurality of portal snippets with the first operation, the plurality of portal snippets including the first portal snippet;
   wherein the first and second operations are provided with first and second priority values, respectively;
   wherein the first and second priority values are displayable in priority fields of the operation editor; and
   wherein the operation editor is for review and modification of the priority values displayed in the priority fields.

2. The method of claim 1, further comprising:
   launching a second target portal snippet associated with the second operation if the second operation has been determined to be the appropriate operation at the determining step.

3. The method of claim 1, wherein the first priority value being higher than the second priority value, wherein the first operation is set as a default operation to invoke.

4. The method of claim 3, wherein the first operation is determined to be the appropriate operation if the user selects the business object using a first button of a mouse.

5. The method of claim 4, wherein the first button of mouse is a left button of the mouse.

6. The method of claim 4, wherein the user is provided with a list of the plurality of operations if the user selects the business object using a second button of the mouse.

7. The method of claim 6, wherein the second button of the mouse is a right button of the mouse.

8. The method of claim 6, further comprising:
   receiving a user selection on the appropriate operation to invoke based on the list of the plurality of operations presented to the user, wherein the determining step is based on the received user selection on the appropriate operation.

9. The method of claim 1, wherein the user is assigned a first role, the first operation being related to the first role and the second operation being related to a second role;
   wherein the determining step is based on a role assigned to the user, so that the appropriate operation is determined to be the first operation.

10. The method of claim 1, wherein the portal snippet is an iView or presentation component.

11. The method of claim 1, wherein first target portal snippet is launched as a result of invoking the first operation, the invoking the first operation including:
   sending a portal event to an event handler of the source portal snippet; and
   activating an object based navigation call to launch the first target portal snippet.

12. A method of navigating within a portal environment including a client and a portal, the method including:
   receiving a request based on a user's selection of a given business object from a plurality of business objects presented in a source portal snippet, each business object including a kernel in a first layer and business logic in a second layer, the selected business object having a plurality of operations that are associated to the selected business object, the plurality of operations including first and second operations;
   determining an appropriate operation to invoke from the plurality of operations, the first operation being determined to be the appropriate operation, the first operation being related to a first target portal snippet and a second target snippet;
   determining an appropriate portal snippet to launch, the first target portal snippet being assigned to a first role and the second target portal snippet being assigned to a second role; and
   launching the first target portal snippet associated with the first operation if the first target portal snippet is determined to be the appropriate target portal snippet;
   wherein the first portal snippet is displayable in a table of an operation editor that associates a plurality of portal snippets with the first operation, the plurality of portal snippets including the first portal snippet;

wherein the first and second operations are provided with first and second priority values, respectively;

wherein the first and second priority values are displayable in priority fields of the operation editor; and wherein the operation editor is for review and modification of the priority values displayed in the priority fields.

13. The method of claim 12, wherein each of the portal snippets includes a query portion to retrieve desired information and a presentation portion to display the retrieved information to the user.

14. The method of claim 12, wherein the user is assigned the first and second roles, the first target portal snippet being assigned with a higher priority than the second target portal snippet.

15. The method of claim 12, wherein the user is assigned the first and second roles, the first role being assigned with a higher priority than the second role.

16. A non-transient computer readable medium including a computer program for navigating within a portal environment including a client and a portal, the program comprising:

code for receiving a request based on a user's selection of a given business object from a plurality of business objects presented in a source portal snippet, each business object including a kernel and business logic, the selected business object having a plurality of operations that are associated thereto, the plurality of operations including first and second operations;

code for determining an appropriate operation to invoke from the plurality of operations;

code for launching a first target portal snippet associated with the first operation if the first operation has been determined to be the appropriate operation at the determining step, and code for launching a second target portal snippet associated with the second operation if the second operation has been determined to be the appropriate operation at the determining step, wherein the first portal snippet includes a query portion to retrieve desired information and a presentation portion to display the retrieved information to the user; and wherein the first portal snippet is displayable in a table of an operation editor that associates a plurality of portal snippets with the first operation, the plurality of portal snippets including the first portal snippet;

wherein the first and second operations are provided with first and second priority values, respectively;

wherein the first and second priority values are displayable in priority fields of the operation editor; and wherein the operation editor is for review and modification of the priority values displayed in the priority fields.

17. A portal coupled to one or more clients and having access to a plurality of databases, the portal comprising:

a computer comprising:

means for receiving a request based on a user's selection of a given business object from a plurality of business objects presented in a source portal snippet, each business object including a kernel and business logic, the selected business object having a plurality of operations that are associated thereto, the plurality of operations including first and second operations;

means for determining an appropriate operation to invoke from the plurality of operations; and means for launching a first target portal snippet associated with the first operation if the first operation has been determined to be the appropriate operation at the determining step, wherein the first portal snippet includes a query portion to retrieve desired information and a presentation portion to display the retrieved information to the user; and wherein the first portal snippet is displayable in a table of an operation editor that associates a plurality of portal snippets with the first operation, the plurality of portal snippets including the first portal snippet;

wherein the first and second operations are provided with first and second priority values, respectively;

wherein the first and second priority values are displayable in priority fields of the operation editor; and wherein the operation editor is for review and modification of the priority values displayed in the priority fields.

18. A portal coupled to a plurality of clients and having access to a plurality of databases, the portal comprising:

a portal server to communicate with the clients;

a unification server to communicate with one or more external applications;

a portal content repository to store a plurality of portal snippets; and a non-transient computer readable medium including a computer program for navigating within a portal environment, the computer program including:

code for receiving a request based on a user's selection of a given business object from a plurality of business objects presented in a source portal snippet, each business object including a kernel and business logic, the selected business object having a plurality of operations that are associated thereto, the plurality of operations including first and second operations, code for determining an appropriate operation to invoke from the plurality of operations, and code for launching a first target portal snippet associated with the first operation if the first operation has been determined to be the appropriate operation at the determining step, wherein the first portal snippet includes a query portion to retrieve desired information and a presentation portion to display the retrieved information to the user; and wherein the first portal snippet is displayable in a table of an operation editor that associates a plurality of portal snippets with the first operation, the plurality of portal snippets including the first portal snippet;

wherein the first and second operations are provided with first and second priority values, respectively;

wherein the first and second priority values are displayable in priority fields of the operation editor; and wherein the operation editor is for review and modification of the priority values displayed in the priority fields.

19. The portal of claim 18, wherein the computer program further comprises code for launching a second target portal snippet associated with the second operation if the second operation has been determined to be the appropriate operation at the determining step.

20. The portal of claim 18, wherein the first priority value being higher than the second priority value, wherein the first operation is set as a default operation to invoke.

* * * * *